(12) United States Patent
Ayadurai et al.

(10) Patent No.: US 9,713,160 B2
(45) Date of Patent: Jul. 18, 2017

(54) METHODS AND ARRANGEMENTS FOR ALLOCATION OF RADIO RESOURCES

(75) Inventors: Vicknesan Ayadurai, Sollentuna (SE); Mikael Prytz, Rönninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 297 days.

(21) Appl. No.: 14/352,029

(22) PCT Filed: Oct. 20, 2011

(86) PCT No.: PCT/SE2011/051253
§ 371 (c)(1),
(2), (4) Date: Apr. 15, 2014

(87) PCT Pub. No.: WO2013/058688
PCT Pub. Date: Apr. 25, 2013

(65) Prior Publication Data
US 2014/0254573 A1    Sep. 11, 2014

(51) Int. Cl.
*H04W 72/04* (2009.01)
*H04W 72/08* (2009.01)
*H04W 24/06* (2009.01)
*H04W 24/04* (2009.01)

(52) U.S. Cl.
CPC ..... *H04W 72/0493* (2013.01); *H04W 72/082* (2013.01); *H04W 24/06* (2013.01); *H04W 72/04* (2013.01)

(58) Field of Classification Search
CPC ...... H04W 24/06; H04W 72/04; H04W 72/08
See application file for complete search history.

(56) References Cited

U.S. PATENT DOCUMENTS

| | | | | |
|---|---|---|---|---|
| 5,359,595 A | * | 10/1994 | Weddle | ............ H04J 4/00 370/468 |
| 5,808,551 A | * | 9/1998 | Yarnall, Jr. | ........ A01K 15/023 119/721 |
| 6,141,546 A | | 10/2000 | Thomas et al. | |
| 6,731,625 B1 | * | 5/2004 | Eastep | ............ H04L 29/06 370/352 |

(Continued)

OTHER PUBLICATIONS

Kucera, S. and Zhang, B. "Low-complexity admission control for distributed power-controlled networks with stochastic channels" Personal Indoor and Mobile Radio Communications (PIMRC), 2010 IEEE 21st International Symposium on Sep. 26-30, 2010.*

*Primary Examiner* — Xavier Szewai Wong
(74) *Attorney, Agent, or Firm* — Murphy, Bilak & Homiller, PLLC

(57) ABSTRACT

The invention relates to a method for allocating a common radio resource for simultaneous transmission of data streams in multiple pairs of communication nodes in a multi-node wireless network. The invention also relates to a method of assessing radio resource isolation in a multi-node wireless network. The inventive methods include transmission (44) of at least a first and a second test probe message on a common radio test resource. Receipt of the intended test probe messages are verified (45), whereupon radio resource isolation may be determined and a common radio resource allocated (46) for transmission in the tested communication node pairs. The invention also relates to a communication node and a control node wherein the inventive methods are applied.

10 Claims, 8 Drawing Sheets

(56) References Cited

U.S. PATENT DOCUMENTS

| | | | |
|---|---|---|---|
| 7,801,071 B2* | 9/2010 | Gollamudi | H04W 16/28 370/323 |
| 2003/0185152 A1* | 10/2003 | Nederveen | H04L 43/12 370/229 |
| 2008/0146166 A1* | 6/2008 | Khan | H04B 7/0682 455/78 |
| 2009/0073954 A1 | 3/2009 | Maltsev et al. | |
| 2009/0116444 A1 | 5/2009 | Wang et al. | |
| 2010/0074119 A1* | 3/2010 | Krishnaswamy | H04L 47/10 370/242 |
| 2011/0222408 A1 | 9/2011 | Kasslin et al. | |
| 2011/0228730 A1 | 9/2011 | Abraham et al. | |
| 2013/0077565 A1* | 3/2013 | Jacobs | H04W 88/08 370/328 |

* cited by examiner

METHODS AND ARRANGEMENTS FOR ALLOCATION OF RADIO RESOURCES

FIELD OF THE INVENTION

The present invention relates to allocation of a common radio resource for simultaneous transmission of data streams in multiple pairs of communication nodes in a multi-node wireless network.

BACKGROUND OF THE INVENTION

In a multi-node wireless network, such as a cellular radio network, each information stream is typically transmitted on its own radio resource, channel, so as not to result in interference between the different streams.

A multi-node wireless network generally uses a certain partition of the available spectrum for providing services. The available spectrum is divided into channels depending on the type of wireless network. Frequency-division multi-access (FDMA) uses different frequency bands for each channel. In time-division multi-access systems (TDMA), the channels are made up of time slices or time slots on a frequency band. The channels may also be defined through code-division multi-access (CDMA) or any combination of these techniques. In LTE/OFDM systems the scheduling resources is a physical resource block pair. Regardless of the system in use, the different channels should ensure isolation between different information streams. However, as the available number of channels is limited, the channels must be reused within different geographical sub-areas, so-called cells, in order to provide coverage and capacity. With an increasing number of wireless devices, there is an increasing need for further optimized use of the limited number of available channels in a wireless network.

Depending on technology choices and factors such as what multiple access techniques that are employed and how robust to interference the information stream receivers are, reuse of the radio resources, channels, may be possible within a cell. If it can be determined that paths of two separate streams are sufficiently isolated from each other, they could then potentially carry out their individual transmissions on identical channels and still not interfere with each other, resulting in a re-use of the valuable limited channel resource.

In the wireless network, information streams between communication nodes are set up on radio resources, also denoted as channels. The radio resource may be a frequency in a FDMA system, a time slot in a TDMA system, a resource block in a OFDM system or any other type of radio resource. Isolation between different information streams in the network is ensured by use of non-overlapping radio resources. Re-use of the same radio resource for transmission of different information streams between multiple sets of communication nodes, is possible only when the information streams are sufficiently isolated from one another. The cellular planning of a wireless network is based on the possibility to re-use channels that are sufficiently distanced from one another. However, information streams may be sufficiently isolated to allow for a more optimal channel or radio resource re-use.

The primary problem with re-using channels lies in the determination of whether independent streams are sufficiently isolated from each other. A conventional way to determine if two sending nodes can transmit on the same channel is done via measurements of the different signal powers at the receivers. Typically, the receivers would measure the received signal strength of their "own" source's transmission, as well as the signal strength of the "other" source's transmission, and potentially also the 'ambient' background signal strengths. By analyzing the combination of these various signal power levels, together with knowledge of the receiver's hardware characteristics, it can then be possible to estimate whether both transmitters can transmit simultaneously on the same channel, while each receiver only receives its intended information.

EP, 1589776 discloses a method and an arrangement for allocation of radio resources in mobile communications systems, wherein the mobile stations perform measurements of pilot signal power to enable increased channel reuse. The mobile station measures quality measures of signals transmitted from a multitude of base stations. The measurements are reported to a base station that assigns resources based on the measurement results. The disclosed method and arrangement improves the possibility for channel re-use in a wireless network, but is still based on determination of channel isolation from mobile measurements and reported signal strength values.

However, determinations on channel re-use based on signal power measurements from the terminals is not trivial to carry out and a conclusive outcome difficult to ascertain. Hardware imperfections would make it difficult for the control node to estimate with confidence what each receiver can successfully decode. Furthermore, the receivers may be different types of devices with different receiver sensitivities, e.g., mobile handsets as compared to low-power sensors, making it even more challenging for the control node to make an accurate estimation without specific knowledge of the types of receiver hardware involved.

SUMMARY

It is a general object of the present invention to provide resource allocation methods and arrangements that improves the ability to re-use radio resources in a wireless network.

The object is achieved by a method for allocating a common radio resource for simultaneous transmission of different data streams in multiple pairs of communication nodes in a multi-node wireless network. Prior to allocating the common radio resource, at least two pairs of communication nodes are chosen for testing. A common radio test channel is allocated for transmission from a transmitter in a first pair of the multiple pairs of communication nodes and from a second pair of the multiple pairs of communication nodes. A first test probe message is transmitted on the common radio test channel from the transmitter in the first pair of communication nodes. A second test probe message, different from the first test probe message, is transmitted from the transmitter in the second pair of communication nodes. The first and second test probe messages are transmitted in at least partly overlapping time. Receipt of the first test probe message in the receiver in the first pair of communication nodes and receipt of the second test probe message in the receiver in the second pair of communication nodes is determined. If the first test probe message is intelligibly received in the receiver in the first pair of communication nodes and the second test probe message is intelligibly received in the receiver in the second pair of communication nodes, the common radio resource is allocated to the transmitter in the first pair of communication nodes as well as to the transmitter in the second pair of communication nodes.

Another object of the present invention is to provide a communication node in a multi-node wireless network. Such a communication node could be a transmitting node, a receiving node or a combination of the two.

The transmitting communication node comprises a transmitter. The communication node further includes means to receive information on a test probe message, and to initiate transmission of the test probe message at a given point in time.

The receiving communication node comprises a receiver and further includes means to receive information on a test probe message; and to initiate receipt of the test probe message at a given point in time. The receiving communication node includes a comparator for verifying the received test probe message with the received information on the test probe message.

A further object of the present invention is to provide a method in a transmitting communication node, wherein the transmitting communication node receives information on a test probe message. The transmitting communication node also receives instructions on future transmission of the test probe message on a common radio test resource at a given point in time. The transmitting communication node performs transmission of the test probe message on the common radio test resource.

It is a further object of the present invention to provide a method in a receiving communication node. The receiving communication node receives information on a test probe message from a control node and receives instructions on the future expected receipt of this test probe message at a given point in time. The receiving communication node verifies receipt of the intended test probe message and reports receipt to a control node.

Another object of the present invention is to provide a control node in a multi-node wireless network for allocating radio resources. The control node includes all the conventional components of a control node such as a transmitter, a receiver and a resource allocator. The control node further includes a probe instruction generator and an evaluator for evaluating a probe report and to provide information on the evaluation to the resource allocator.

It is a further object of the present invention to provide a method in a control node to enable improved simultaneous re-use of radio resources.

The object is achieved in a method in a control node for assessing radio resource isolation. At least two pairs of communication nodes are chosen for channel isolation testing. A common radio test channel is allocated for transmission on a first radio path from a transmitter in a first pair of communication nodes and on a second radio path from a transmitter in a second pair of communication nodes. A first test probe message is transmitted on the first radio path and a second test probe message, distinct from the first test probe message, on the second radio path. The first and second test probe messages are transmitted in at least partly overlapping time. Receipt of the first test probe message is verified in the receiver in the first pair of communication nodes and receipt of the second test probe message in the receiver in the second pair of communication nodes. Information on the receipt of the intended test probe messages is communicated to the control node, whereupon the control node determines radio resource isolation between the first radio path and a second radio path receiving reports on the receipt of the test probe messages from the communication nodes and evaluating these reports. If both test probe messages are correctly received in their respective receivers, the common radio test resource is allocated as a common radio resource.

It is an advantage of the inventive methods and node arrangements that channel allocation and channel isolation testing may be achieved in the communication node arrangements themselves without further evaluation in the control node. This improves the ability for channel re-use in a multi-node network. It is a further advantage of the invention that radio resource utilization may be improved.

DETAILED DESCRIPTION

Figure 1:
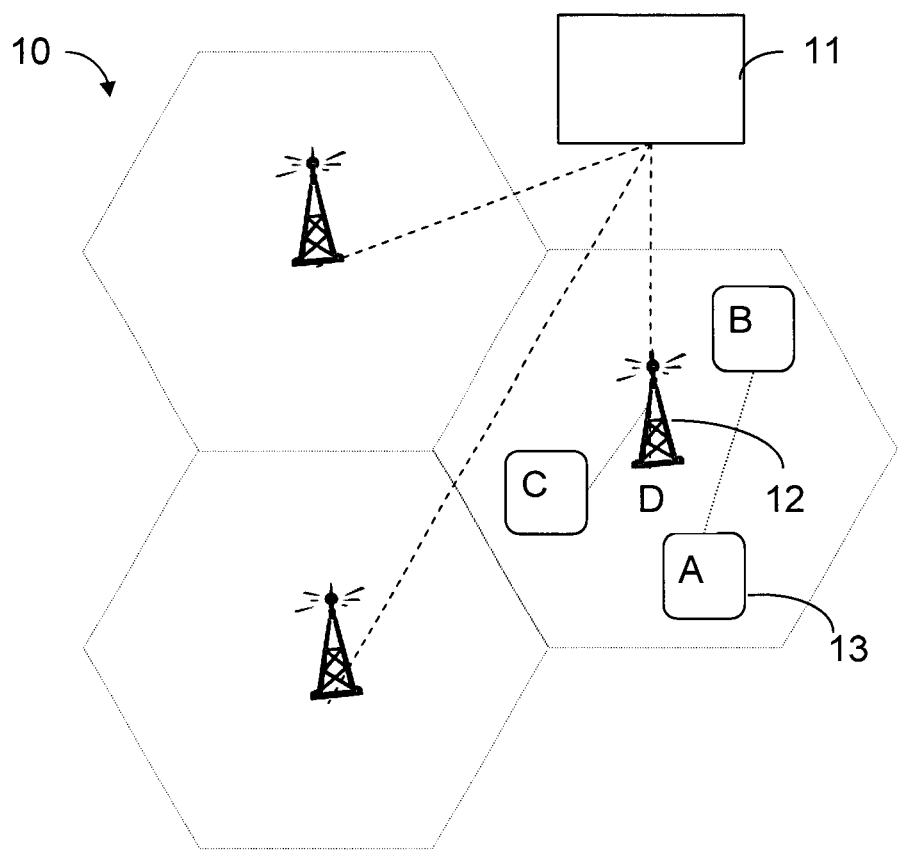
FIG. 1 is a schematic illustration of a multi-node wireless communications network

FIG. 1 discloses an exemplifying schematic illustration of a multi-node wireless communications network 10. In FIG. 1, the wireless network 10 comprises a core network 11 and a plurality of control nodes 12 connected to the core network 11. A control node could be any type of radio access node in a wireless communication system, such as an eNB in an LTE UTRAN system, or a base station in a GSM or WCDMA system. A control node could also be a RNC, a separate control node, a separate radio resource management node, an evolved controller or any other type of control node. An important function of the control node 12 is to allocate radio resources to user nodes present within the geographical area of the control node, also known as cell. User nodes 13 situated within a cell will typically be connected to the wireless communications network 10 via a radio resource to at least one control node 12. A user node 13 is a communication node that may transmit and receive information streams to other communication nodes in the network. A user node could be user equipment (UE), also known as e.g. mobile terminal, wireless terminal and/or mobile station. User equipment may further be referred to as mobile telephones, cellular telephones, or laptops with wireless capability, just to mention some further examples. The user equipments in the present context may also be, for example, portable, pocket storable, hand-held, computer—comprised, or vehicle-mounted mobile devices, enabled to communicate voice and/or data, via the RAN, with another entity, such as user equipment or a server. The user node could also be any type of wireless telemetry equipment enabled to communicate data via the RAN. The control node 12 provides control signaling for the user nodes in the network, but may also be a communication node in an information stream to another communication node 13. The schematic illustration includes communication nodes A,B, C and D, wherein communication node D is also a control node. The following description will be referenced to the wireless communications network according to the exemplifying schematic illustration in FIG. 1. However, it should be noted that the invention is not limited to the network configuration disclosed in FIG. 1.

Figure 2:
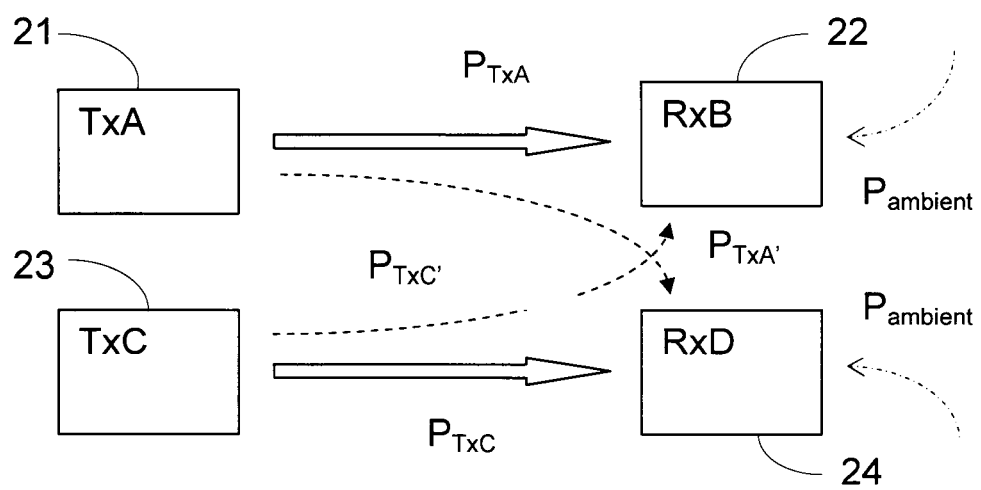
FIG. 2 is a block diagram of a communication node pairs illustrating prior art solutions based on signal power measurements in the communication nodes

A conventional way to determine if two pairs of communication nodes A,B; C,D may re-use the same radio resource is disclosed in FIG. 2. The receivers RxB 22 and RxD 24 in receiving nodes in a communication node pair are instructed to measure signal powers. Typically, a receiver RxB 22 would measure the received signal strength $P_{TxA}$ from corresponding transmitter TxA 21 in the pair of communication nodes A,B and receiver RxD 24 would measure the received signal strength $P_{TxC}$ from transmitter TxC 23 in the pair of communication nodes C,D. In addition to these measurements, the receivers RxD 22 and RxD 24 in the two pairs of communication nodes would measure received signal strength $P_{TxC}$, $P_{TxA}$ from corresponding transmitters in the other pair of communication nodes and ambient background signal strengths $P_{ambient}$.

The received signal power levels are reported to the control node 12 for analysis. By analyzing the combination of these various signal power levels, together with knowledge of the receiver's hardware characteristic, the control node may estimate that both transmitters may transmit simultaneously on the same radio resource whilst delivering different information streams to the respective receivers. The respective receiver will be able to intelligibly detect the information stream, i.e., to interpret the content of the received information streams. The centralized control provides the ability for instant rescheduling of radio resources, but also for more long-term reconfiguration. However, measurements of signal power level does not provide for a radio resource allocation that takes account of hardware imperfections, varying receiver sensitivities and effect of power control algorithms.

Figure 3:
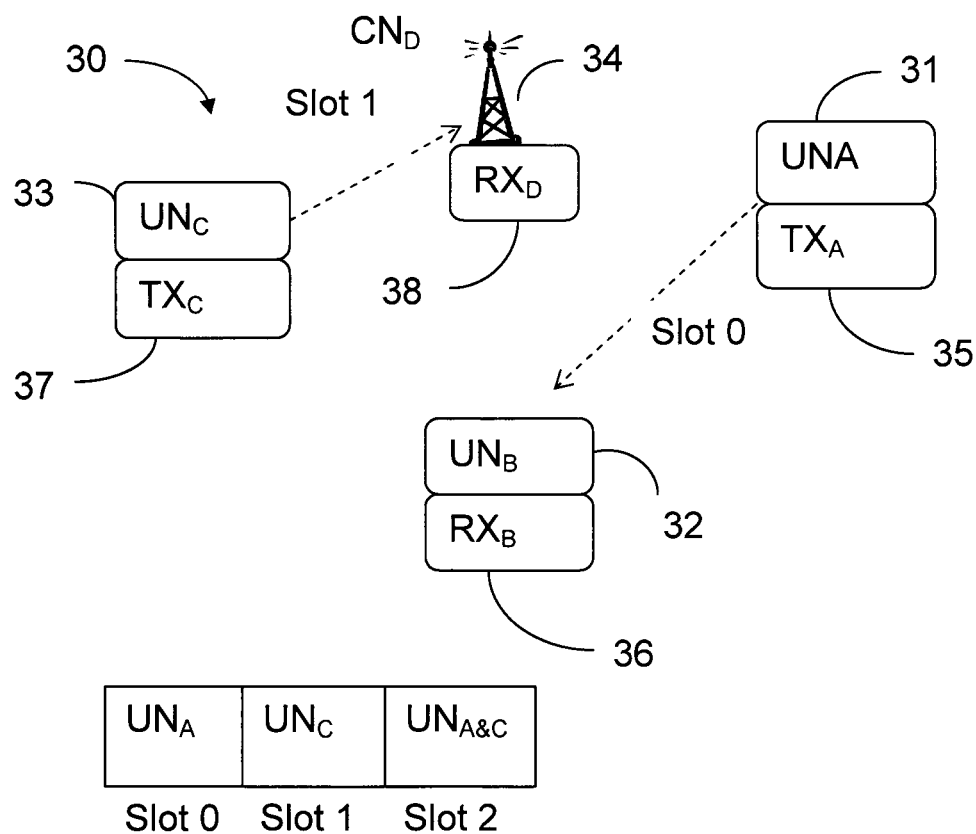
FIG. 3 is a schematic illustration of a communication node pairs illustrating the inventive solution

FIG. 3 discloses the scenario for carrying out the inventive method in a simplified version of a TDMA-based communications scenario. In contrast to the conventional method described for FIG. 2, a receiver in a communication node pair is able to evaluate the possibility of successfully re-using a radio resource under instructions from a control node. The additional allowed radio resource determined by application of the inventive method will be specific for each communication node pair and does not alter the general assignment of radio resources for use within a control node cellular environment. The inventive method may be applied regardless of the type of radio resource or channel coding techniques that are used.

A wireless network 30 includes a control node 34 and three communication nodes $UN_A$ 31, $UN_B$ 32, $UN_C$ 33. The control node 34 has allocated slot 0 for communications node $UN_A$ 31 to transmit data to communications node $UN_B$ 32. With a third device, communications node $UN_C$ 33, in the network setting up a data transfer stream to the control node CN 34, slot 1 is allocated for transmission from $UN_C$ 33. The control node is allocating resources and can also initiate an investigation if the two radio channels between communication node pair $UN_A/UN_B$ and communication node pair $UN_C/CN$ are sufficiently isolated so that both communication node pairs may re-use the same radio resource for simultaneous transmission of data streams with different information content whilst still maintaining the ability in the receiving nodes to detect the content of each individual data stream.

Figure 4:
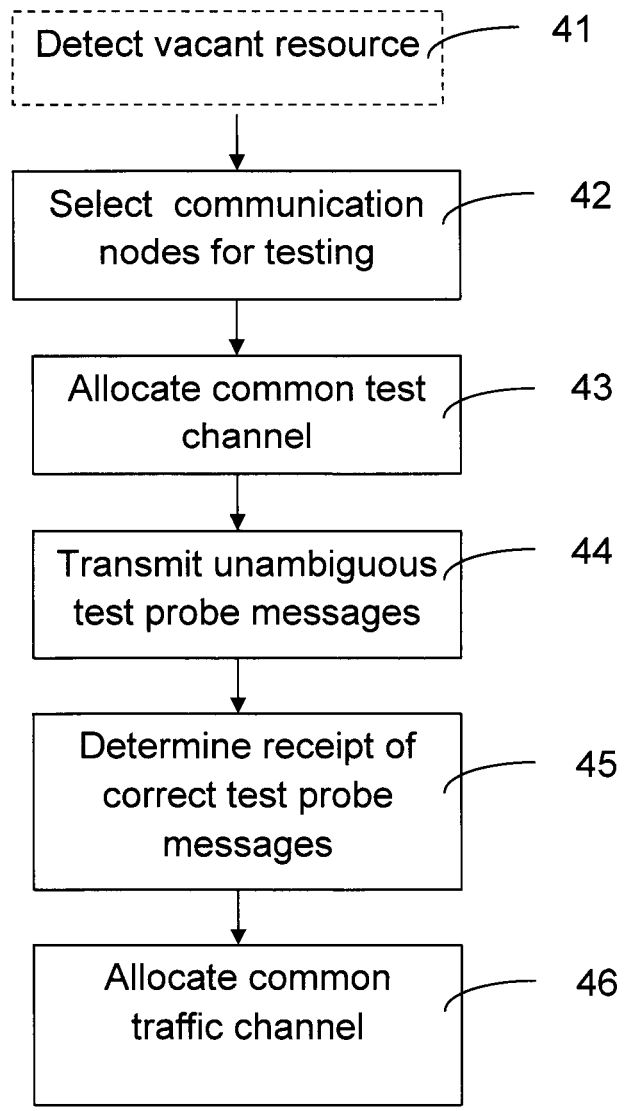
FIG. 4 is a flowchart illustrating method steps according to an embodiment of the present invention

FIG. 4 discloses a flow chart of an embodiment of the inventive method, which will be discussed with reference to the scenario in FIG. 3. In a first optional step 41, the control node detects a vacant resource to be evaluated for possible re-use. In a subsequent step 42, the same control node selects two or more communication nodes to involve in the test. In the exemplifying embodiment disclosed in FIG. 3, the communications node pairs $UN_A/UN_B$ and communication node pair $UN_C/CN$ are selected for testing.

In step 43 a vacant resource is allocated as a common radio test resource to the transmitter in $UN_A$ and to the transmitter in $UN_C$. If a vacant resource was detected in the first optional step 41, the allocated common radio test resource will correspond to this vacant resource. However, it is also possible that the control node chooses to vacate a radio resource for the purpose of testing and allocates this vacated radio resource as the common radio test resource. In the exemplifying scenario according to FIG. 3, the common radio test resource corresponds to Slot 2 in the TDMA frame. Any other common radio resource would of course also be possible to choose as a common radio test resource, with the exception of the resources reserved for transmission of on-going data streams. In the illustrated scenario, Slot 0 and Slot 1 are used for on-going data transmissions from a transmitter $TX_A$ in communications node $UN_A$ 31 to a receiver $RX_B$ in communications node $UN_B$ 32 and from a transmitter $TX_C$ in communications node $UN_C$ 33 to a receiver $RX_D$ in the control node $CN_D$ 34.

In an embodiment of the invention, the step of allocating the common radio test resource for transmission of test probe messages also includes instructing the transmitters on when to start transmitting on the common radio test resource and correspondingly instructing the receivers on when to start receiving. Furthermore, the instructions from the control node to the transmitters and receivers may also include information on the individual test probe message to be used for performing the channel isolation test in a communication node pair. A test probe message could typically include a header identifying the nature of the message as a test probe message, a payload containing a unique address of the sender, and a crc-validation ending the message. The unique address of the sender could be a MAC (Medium Access Control) address of the sender. However, any other type of message structure suitable for probing, is included within the scope of the invention. Test probe messages unique for each communication node, may also be pre-configured and stored in the communication node.

In step 44 transmitters $TX_A$ 35 and $TX_C$ 37 in the communication node pairs $UN_A$, $UN_B$; $UN_C$, CN start transmission on the allocated common radio test resource. Each transmitter transmits their individual test probe message; specific for each individual transmitter at least at the time of transmission. The test probe messages are preferably sent simultaneously, or at least partially overlapping, from each individual transmitter at a specified time in the future on instructions from the control node. The test probe message associated with the transmitter $TX_A$ 35 in the first communication node pair differs from the test probe message associated with the transmitter $TX_C$ 37 in the second communication node pair, i.e., the transmitter $TX_A$ transmits a first test probe message and the transmitter $TX_C$ transmits a second test probe message different from the first test probe message.

In step 45 the receivers $RX_B$ 36 and $RX_D$ 38 in the communication node pairs listen to the assigned common radio test resource following the instructions from the control node. The receivers have information relating to what test probe message that each receiver should expect to receive. The test probe messages are unambiguous, in the sense that it is possible for the respective receiver to determine that the intended test probe message has been received. If a time has been specified in the instructions to the respective receiver, the receivers will start listening at this time. If time of receipt has not been specified, the receivers will tune to the common channel promptly and continue receiving on this channel until receiving other instructions.

The receivers $RX_B$ 36 and $RX_D$ 38 determine receipt of the intended test probe messages. The receiver $RX_B$ 36 in the first communication node pair determines intelligible receipt of the first test probe message and the corresponding receiver $RX_D$ 38 in the second communication node pair determines of the second test probe message. In an embodiment of the invention, the test probe messages are data packets specific for the test situation and each individual transmitter. In this embodiment, receipt will be determined when the intended test probe message is received. During the step of determining receipt of test probe messages, the validity information is confirmed. Thus, confirmation relating to the receipt of the correct test probe message requires both confirmation of validity information and a positive outcome of the comparison between an expected test probe message and the received test probe message.

Step 45 also includes the reporting of the result of the determination to the control node. If the test probe message is not correctly received, this may be reported to the control node so that the response to the control node is either a confirmation of receipt or a reporting of failure to receive.

In step 46, a common radio resource is allocated for the continued on-going data streams between the two communication node pairs. In an embodiment of the invention, a decision is formed in the control node that the transmitter 35 in the first pair of communication nodes and the transmitter 37 in the second pair of communication nodes may transmit on a common radio resource, whereupon the control node 34 performs the step 46 of allocating the common radio resource to the transmitters 35, 37. The allocated common radio resource could be the common radio test resource or any other common channel that the test result is applicable for.

The same method of sending probe messages simultaneously in communication node pairs in a wireless network may be repeated for additional communication node pairs and is not limited to evaluating re-use between two communication node pairs. Steps 40 to 46 are possible to perform for any number of communication node pairs in the wireless network. However, if testing is performed for a large number of communication node pairs, it will be less likely that the test will result in an allocation of a common radio resource for the communication between all the tested communication node pairs.

The step of transmitting a test probe message may be repeated so that further test probe messaging is performed prior to allocating the common radio resource to the transmitters in the first and second pair of communication nodes. A more thorough probing should in most cases be performed to ensure that there is negligible interference between the two transmitters and to better estimate the isolation between the transmitters.

The method has been described for a simplified scenario in a TDMA system. However, it is obvious to the person skilled in the art that the principles of the inventive method may be carried out for network where the radio resources are set up according to FDMA techniques, OFDM techniques or any other type of radio access techniques.

Figure 5:
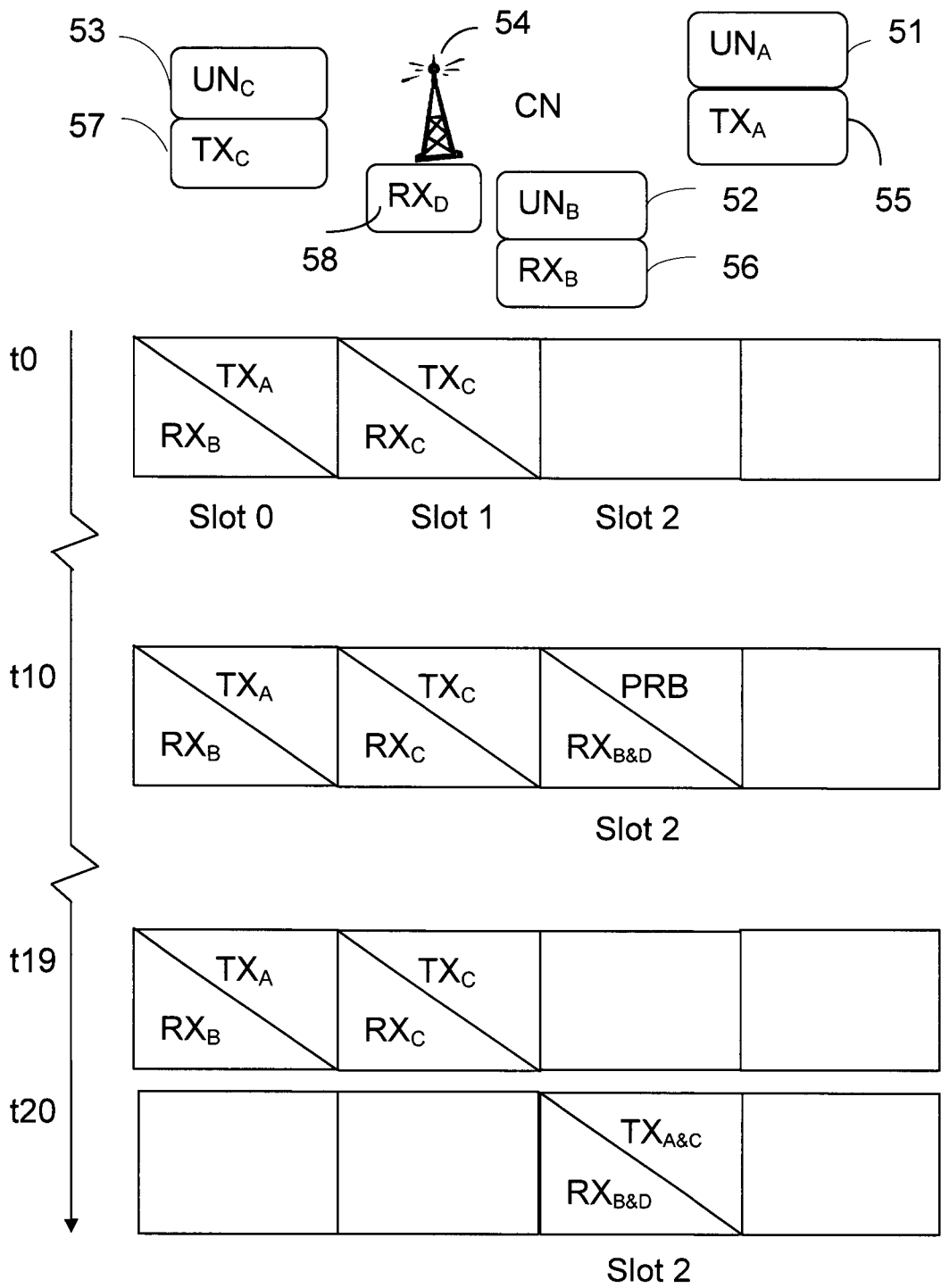
FIG. 5 is a timeline illustrating the timing of the method steps according to FIG. 4

FIG. 5 discloses a timeline for the signaling in the disclosed simplified scenario.

Starting at a time t0, there is a first on-going data stream on a slot 0 between a transmitter $TX_A$ 355 and a receiver $RX_B$ 56 in a first communication node pair. A second data stream is on-going on Slot 1 between a transmitter $TX_C$ 57 and a receiver $RX_D$ 58 in a second communication node pair. A control node provides instructions to the communication nodes over a control channel according to state of the art for control signaling in a TDMA system.

At time t1, the control node 54 schedules transmitters $TX_A$ 55 and $TX_C$ 57 to send testprobe messages on a slot 2 at time t10 and also schedules receiver $RX_B$ 36 and $RX_D$ 38 to listen to slot 2 at time t10. The on-going first and second data streams are continued on Slot 0 and Slot 1.

From time t2-t9, there are on-going parallel data streams on Slot 0 and Slot 1.

At time t 10, the on-going parallel data streams continue. In addition to the data streams, transmitter $TX_A$ 55 and $TX_C$ 57 send their individual probe messages simultaneously on Slot 2 as instructed by the control node. Receivers $RX_B$ 56 and $RX_D$ 58 listen to Slot 2.

At time t11 receivers $RX_B$ 56 and $RX_D$ 58 report their probe reception results to the control node. The ongoing parallel data streams on Slot 0 and Slot 1 are maintained.

Following successful reception of the intended test probe message in each of $RX_B$ 56 and $RX_D$ 58, the control node allocates Slot 2 to transmitters $TX_A$ and $TX_B$, from time t20. Thus, data streams presently on slot 0 and slot 1 will be transferred to slot 2 at time t20. During time t11-t19, the parallel data streams on slot 0 and slot 1 are continued.

At time t20, the transmitters start delivering the ongoing parallel data streams on Slot 2 so that transmitter $TX_A$ 55 transmits the data stream to receiver $RX_B$ 56 on Slot 2 and transmitter $TX_C$ 57 transmits the data stream to receiver $RX_D$ 58 on slot 2 as well.

The invention also includes a method of assessing resource isolation in a multi-node wireless system. With the simplified scenario disclosed in FIG. 3, two user nodes $UN_A$ 31 and $UN_B$ 32 are operating in a 3-slot TDMA system. A control node $CN_D$ is allocating resources to the user nodes in the system. In the scenario disclosed in FIG. 3, the control node has allocated Slot 0 for $UN_A$ to transmit data to $UN_B$.

Upon arrival of a 3rd user node device $UN_C$, the control node may wish to investigate if two channels are sufficiently isolated to allow re-use of resource for communication wherein $UN_A$ and $UN_C$ belong to different communication node pairs. The control node allocates Slot 1 for transmission from user node $UN_C$.

In order to determine channel isolation and the ability to re-use a radio resource between the two pairs of communication nodes $UN_A$, $UN_B$; $UN_C$ and $CN_D$, existing in the wireless network, the control node $CN_D$ allocates a new timeslot, slot 2, to for transmission of a probe message. The control node instructs the transmitter $TX_A$ 35 in user node $UN_A$ 31 and the transmitter $TX_C$ 37 in user node $UN_C$ 33 to each transmit a test probe message. The test probes messages may, as previously described, include a header identifying the nature of the message as a test probe message, a payload containing a unique address of the sender, and a crc-validation ending the message. The unique address of the sender could be a MAC address of the sender. The test-probe message could be a separate short transmission, in addition to any other ongoing data traffic currently in progress. The test probe messages are sent simultaneously on the same radio resource. By "same radio resource" we imply an identical frequency-band in an FDMA system, an identical timeslot in a TDMA system or any other identical radio resource. The test probe message is transmitted on a separate resource from data resources currently occupied with ongoing data streams.

The receivers, which in the illustrated example are found in the user node $UN_B$ and in the control node $CN_D$, receive the probe signals and report the ability to receive the intended test probe message. Since the transmitters $TX_A$ and $TX_C$, each transmit test probe messages that are known to the respective receivers, the receivers will be able to determine with certainty whether they successfully receive the correct probes. In the ideal case, when the channels between communication node pairs $UN_A$, $UN_B$; $UN_C$, $CN_D$ are adequately isolated from each other, receiver $RX_B$ will receive the test probe message of transmitter $TX_A$ while receiver $RX_D$ will receive the test probe message sent from transmitter $TX_C$. In a case when one or neither one of the receivers $RX_B$ 36 and $RX_D$ 37 receives the intended test probe message, the channels are deemed to lack sufficient isolation. In this case the control node $CN_D$ may optionally choose to repeat the procedure, perhaps after instructing one or both of the transmitters to update their transmit parameters (e.g., decreasing transmit power or increase coding strength, etc.)

Upon receiving reports from $RX_B$ and $RX_D$, the control node will be able to decide whether the two transmitters $TX_A$, $TX_C$ may share the same common resource and still communicate successfully with their respective receivers.

Figure 6:
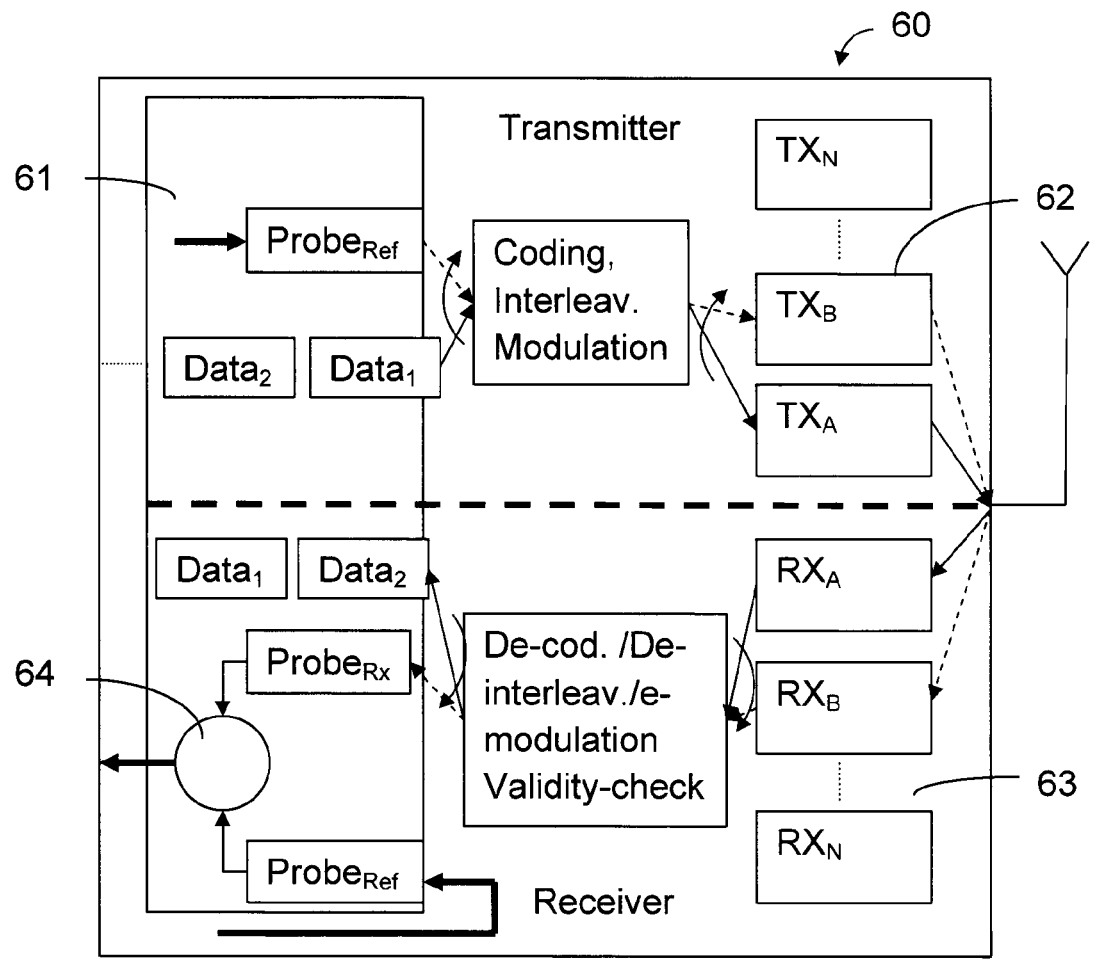
FIG. 6 is a block diagram of an inventive communications node
Figure 6:
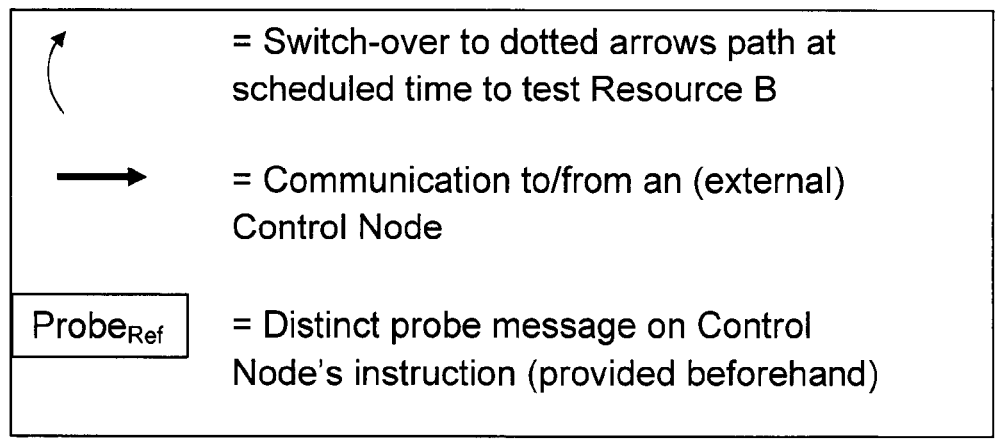

The invention also includes a communication node in a multi node wireless network as disclosed in FIG. 6. The communication node includes a transmitter 62 and a receiver 63. The communication node includes conventional means 61, e.g., a processor or other processing equipment, for processing instructions from a control node and setting up radio resources for communication following such instructions. A separate control channel is provided upon which to receive a test probe message and to perform channel isolation tests based on transmittal and receipt of this test probe message. The transmitter 62 in the communication node is arranged to transmit the test probe message on a radio resource allocated to the communication node in a conventional manner. The receiver 63 includes means to receive the test probe message and to evaluate successful receipt of this test probe message. Evaluation of the successful receipt is performed through comparison in a comparator 64. The communication node contributes to the performance of the methods as described with relation to FIGS. 4, and 8-10.

Figure 7:
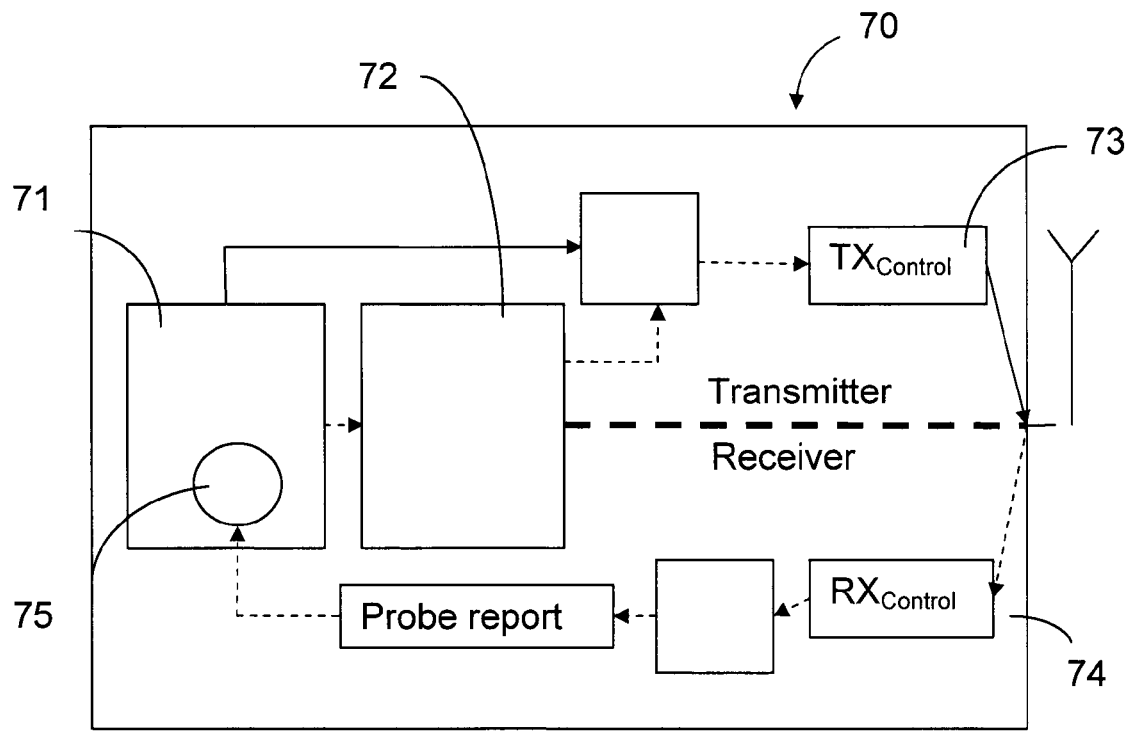
FIG. 7 is a block diagram of an inventive control node

The invention also includes a control node 70 in a multi node wireless network as disclosed in FIG. 7. The control node includes resource isolation testing means 72 that cooperates with conventional scheduling or resource allocating means 71 for allocating resources to communication node pairs in the network. The control node includes means to initiate simultaneous transmission of test probe messages distinct for each transmitter 73 on the common test resource and means for receiving reports from receivers 74 arranged to receive the test probe messages and to evaluate the reports. The test probe messages are generated in a probe instruction generator 72, i.e., a processor or a processing circuitry that is able to generate a plurality of test probe messages and to generate instructions relating to the transmission and receipt of these test probe messages in a communication node. The figure discloses generation of test probe messages A and C to be transmitted from user equipment $UN_A$ and $UN_C$. The system resource allocator 71 is arranged to transfer data communication to a common radio resource corresponding to the common test resource. Scheduling of radio resources is performed in conventional manner in a system resource allocator. The control node 70 contributes to the performance of the methods as described with relation to FIGS. 4, and 8-10.

Figure 8:
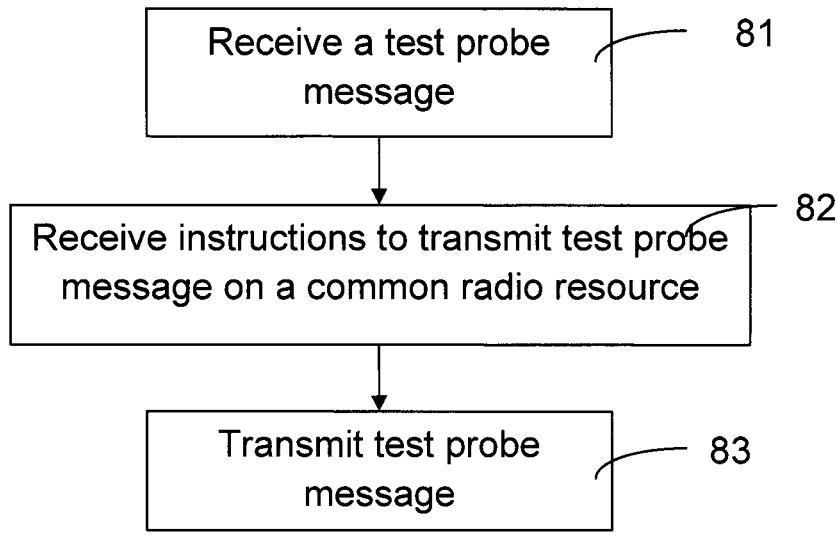
FIG. 8 is a flowchart illustrating method steps according to an embodiment of the present invention

FIG. 8 discloses an embodiment of an inventive method in a transmitting node in a communication node pair, wherein the communication node receives a specification or format of a test probe message to be used in a channel isolation test from the control node in a first step 81. In a consecutive step 82, the communication node receives instructions on the transmission of the test probe message on a common radio test resource. These instructions may include a point in time when the transmission should occur. At the given point in time, the communication node performs the step 83 of transmitting the test probe message on the common radio test resource.

Figure 9:
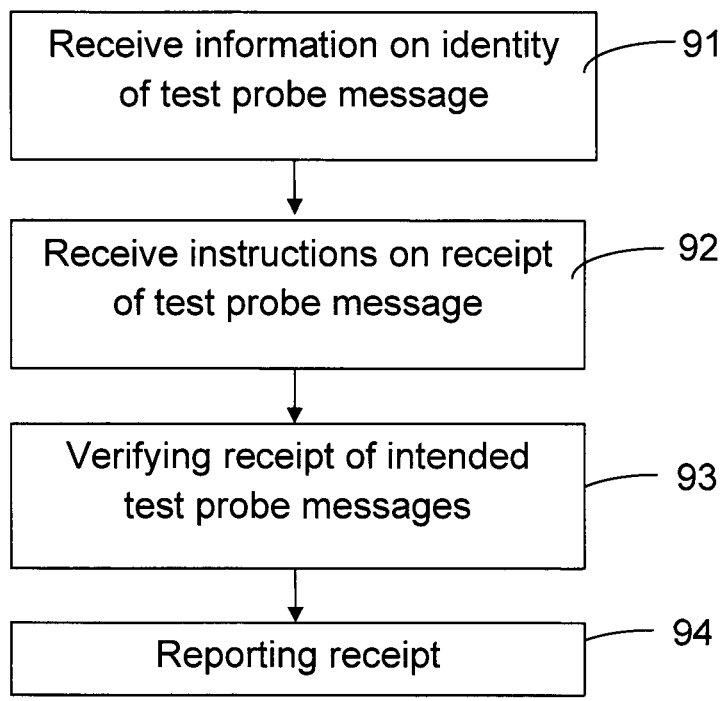
FIG. 9 is a flowchart illustrating method steps according to an embodiment of the present invention

FIG. 9 discloses an embodiment of an inventive method in a receiving node in a communication node pair, including a first step 91 of receiving information identifying a test probe message. In a consecutive step 92, the communication node receives instructions on when to expect receipt of the test probe message and to start receiving on a specified common radio test resource at the expected time of receipt. In a further step 93, the communication node determines receipt of a test probe message, compares the received test probe message with the information identifying the test probe message and determines if the correct test probe message was received in the communication node. The invention also includes the step 94 of reporting the result of the comparison to the control node.

Figure 10:
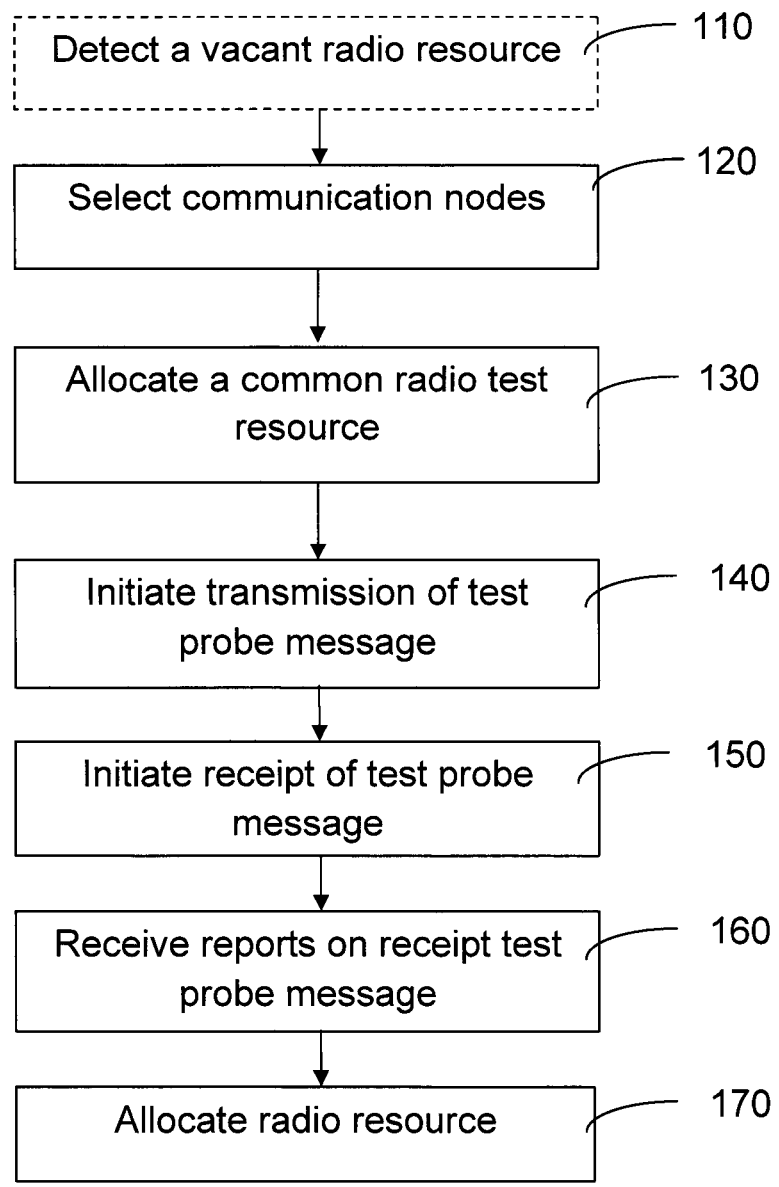
FIG. 10 is a flowchart illustrating method steps according to an embodiment of the present invention

FIG. 10 discloses an embodiment of an inventive method in a control node. The method includes the step 110 of detecting a vacant radio resource. In a consecutive step 120 at least two pairs of communication nodes for testing, followed by a step 130 of allocating a common radio test resource for transmitting on a first radio path from a transmitter in a first pair of communication nodes and on a second radio path from a transmitter in a second pair of communication nodes. In a further step 140 transmission is initiated of a first test probe message from the transmitter in the first pair of communication nodes on the common radio test resource and, at least partly overlapping in time, a second test probe message from the transmitter in the second pair of communication nodes on the common radio test resource. In a corresponding step 150, receipt of the first test probe message in the receiver in the first pair of communication nodes and receipt of the second test probe message in the receiver in the second pair of communication nodes is determined. In step 160 reports are received from the communication nodes relating to receipt of intended test probe messages. If both the intended test probe messages are received in their respective receivers, the method in the control node includes the step 170 of allocating the common radio test resource as a common radio resource.

The inventive methods and nodes have been disclosed for a simplified scenario in a TDMA system, but is not limited to this type of system. For non-TDMA systems, eg., a FDMA system, Slot 0, Slot 1, etc. may be substituted by Freq 0, Freq 1 etc or in an OFDM system by Resource Block 0, Resource Block 1. The invention is only limited by the ability for the participating transmitters to synchronize their transmissions of their individual test probes on the shared radio resource. One way of increasing the ability for the transmitters to simultaneously transmit, would be to transmit longer probe sequences so that a sufficiently significant overlap between transmission period of the different senders is obtained, thus compensating for any lack in the synchronization of the transmissions.

It is of course possible that the communication nodes are mobile devices in motion and that the isolation between the different channels may change over time. In the case when resource re-use is no longer possible, a receiver would inform the control node that assigns one of the transmitters to an alternative slot for transmission.

The inventive method and nodes offers significant advantages in scheduling of radio resources in a wireless network by removing the complexity otherwise needed to assess resource isolation and resource re-use in the network. It distributes part of the resource isolation testing from the control node to communication nodes in the network and removes the need to have knowledge of hardware types in the receivers in order to assess resource isolation.

The invention may be applied to wireless network with increasingly diverse user devices, smaller cells and more device-to-device communications.

The invention claimed is:

1. A method for allocating a common radio resource for simultaneous transmission of data streams in multiple pairs of communication nodes in a multi-node wireless network, the method comprising:
   selecting, for testing, a first pair of communication nodes and a second pair of communication nodes, the first and second pairs of communication nodes have no communication node in common;
   allocating a common radio test resource for transmission from a transmitter in the first pair of communication nodes and from a transmitter in the second pair of communication nodes;
   transmitting a first test probe message from the transmitter in the first pair of communication nodes on the common radio test resource and, during at least a partly overlapping time interval, transmitting a second test probe message from the transmitter in the second pair of communication nodes on the common radio test resource;
   verifying receipt of the first test probe message in the receiver in the first pair of communication nodes and receipt of the second test probe message in the receiver in the second pair of communication nodes; and
   allocating the common radio test resource as the common radio resource to the transmitter in the first pair of communication nodes and to the transmitter in the second pair of communication nodes if the first test probe message is received in the receiver in the first pair of communication nodes and the second test probe message is received in the receiver in the second pair of communication nodes.

2. The method of claim 1, further including:
   reporting the receipt of the first test probe message in the receiver in the first pair of communication nodes and receipt of the second test probe message in the receiver in the second pair of communication nodes to a control node;
   forming a decision in the control node that the transmitter in the first pair of communication nodes and the transmitter in the second pair of communication nodes may transmit on a common radio resource; and
   effecting the step of allocating the common radio test resource as the common radio resource, responsive to said decision.

3. The method of claim 1, further including instructing the transmitters in the first and second pair of communication nodes to simultaneously transmit their respective test probe messages at a specified time in the future.

4. The method of claim 1, further including instructing the receivers in the first and second pair of communication nodes to simultaneously receive their respective test probe messages at a specified time in the future.

5. The method of claim 1, further including:
   allocating the common radio test resource for transmitting from a transmitter in at least a further pair of communication nodes;
   transmitting a further test probe message on the common radio test resource from the transmitter in the further pair of communication nodes at least partly simultaneously with a first test probe message from the transmitter in the first pair of communication nodes and a second test probe message from the transmitter in the second pair of communication nodes.

6. The method of claim 1, wherein each test probe message is a data packet including validity information and the step of determining receipt of test probe messages includes decoding the data packet and verifying the decoded data packet against its validity information.

7. The method of claim 1, wherein the common radio resource is a frequency band in a frequency-division multiple access (FDMA) system.

8. The method of claim 1, wherein the common radio resource is a timeslot in a time-division multiple access (TDMA) system.

9. The method of claim 1, wherein the common radio resource is a physical resource block in a Long-Term Evolution/Orthogonal Frequency-Division Multiplexing (LTE/OFDM) system.

10. A method in a control node to assess radio resource isolation in a multi-node wireless system including multiple pairs of communication nodes, the method comprising:
    selecting, for testing, a first pair of communication nodes and a second pair of communication nodes, the first and second pairs of communication nodes have no communication node in common;
    allocating a common radio test resource for transmitting on a first radio path from a transmitter in the first pair of communication nodes and on a second radio path from a transmitter in the second pair of communication nodes;
    initiating transmission of a first test probe message from the transmitter in the first pair of communication nodes on the common radio test resource and transmission of a second test probe message, during an at least partly overlapping time interval, from the transmitter in the second pair of communication nodes on the common radio test resource;
    initiating receipt of the first test probe message in the receiver in the first pair of communication nodes and receipt of the second test probe message in the receiver in the second pair of communication nodes;
    receiving reports on the receipt of the test probe messages; and
    allocating the common radio test resource as a common radio resource if the intended test probe messages are received in their respective receivers.

* * * * *